United States Patent [15] 3,696,217

Motoyama et al. [45] Oct. 3, 1972

[54] DEVICE USING A RECORDING JACK FOR PREVENTING ERASURE OF RECORDED INFORMATION FROM MAGNETIC TAPE IN A TAPE RECORDER

[72] Inventors: Kazuyasu Motoyama; Ryoichi Sawaki; Takeaki Nakamura, all of Tokyo, Japan

[73] Assignee: Olympus Optical Co., Ltd., Tokyo, Japan

[22] Filed: Aug. 12, 1970

[21] Appl. No.: 63,072

[30] Foreign Application Priority Data

Aug. 14, 1969 Japan....................44/63882

[52] U.S. Cl...................179/100.2 D, 179/100.1 DR, 179/100.2 CA, 200/162

[51] Int. Cl...........................G11b 5/54, G11b 15/04

[58] Field of Search....179/100.2 D, 100.1 DR, 100.2 S,179/100.2 CA; 317/157.51; 335/284; 200/162, 61.58; 274/4 A, 4 D

[56] References Cited

UNITED STATES PATENTS

| | | | |
|---|---|---|---|
| 3,582,566 | 6/1971 | Henriksen et al. | 179/100.2 S |
| 2,823,268 | 2/1958 | Somers | 179/100.1 DR |
| 3,037,093 | 5/1962 | Nowlan | 179/100.2 D |

*Primary Examiner*—Bernard Konick
*Assistant Examiner*—Alfred H. Eddleman
*Attorney*—Kelman and Berman

[57] ABSTRACT

A device for preventing information recorded on the magnetic tape of a tape recorder from being inadvertently erased. The device comprises a first slidable lever having an erasing head, a second slidable lever having a recording and reproducing head for selective movement together with said first lever for recording, or, independently of the first lever, a slidable stop lever for releasing and returning the first and second lever to their initial inoperative positions and locking mechanism for locking the first lever and being controlled and released by a recording jack or recording and reproducing connector.

8 Claims, 12 Drawing Figures

INVENTORS
Kazuyasa Motoyama
Ryoichi Sawaki
Takeaki Nakamura
BY
Kelman and Berman,
Agents INVENTORS
Kazuyasa Motoyama
Ryoichi Sawaki
BY Takeaki Nakamura Kelman and Berman,
Agents INVENTORS
Kazuyasu Motoyama
Ryoichi Sawaki
Takeaki Nakamura
BY
Kelman and Berman,
agents INVENTORS
Kazuyasu Motoyama
Ryoichi Sawaki
Takeaki Nakamura
BY
Wenderoth, Lind & Ponack (signature), Agents INVENTORS
Kazuyasu Motoyama
Ryoichi Sawaki
BY Takeaki Nakamura
Kelman and Berman
Agents

DEVICE USING A RECORDING JACK FOR PREVENTING ERASURE OF RECORDED INFORMATION FROM MAGNETIC TAPE IN A TAPE RECORDER

BACKGROUND OF THE INVENTION

Of late, the size of tape recorders has become smaller and smaller and depressable knobs as the operation mechanisms of such small size tape recorders have been also simplified. In consequence, the various depressable operation knobs are arranged in a closely spaced relation in such a small size tape recorder. However, because of such a closely spaced arrangement of the knobs, there is the possibility that, when an operator depresses the reproducing knob for reproducing information from a recorded magnetic tape, he might also depress the erasing knob unintentionally resulting in erasure of the information recorded on the magnetic tape. Especially, such erroneous depression is often seen when a tape recorder is operated in a dim light environment and/or manually maneuvered in a suit pocket.

For operating any of the conventional tape recorders including the above-mentioned small size tape recorders for recording or reproducing, a recording jack or a reproducing connector is first inserted into the jack or connector insertion opening provided in the tape recorder and then a suitable operation knob selected depending upon the kind of operation is depressed. However, if the jack or connector is not properly inserted in the tape recorder, any recording cannot be obtained on a magnetic tape or informations recorded on the tape cannot be perfectly erased which makes it impossible to properly record information on such an incompletely erased tape.

SUMMARY OF THE INVENTION

The present invention relates to a tape recorder and more particularly, to a device for such a tape recorder which prevents information recorded on a magnetic tape from being inadvertently erased.

One principal object of the present invention is to provide an improved and novel device for a tape recorder which can effectively prevent information recorded on a magnetic tape from being inadvertently erased due to erroneous operation and also prevent improper recording of information on a magnetic tape through erroneous operation.

The device of the present invention is characterized in that by the provision of the device in a tape recorder the erasing head of the tape recorder is actuated only when a recording jack has been perfectly inserted in the jack insertion opening provided in the recorder.

The device of the present invention is further characterized in that by the provision of the device in a tape recorder the locking mechanism for the erasing head is released only after a recording jack has been perfectly inserted in the jack insertion opening provided in the tape recorder whereby the erasing head is allowed to abut against a magnetic tape loaded in the tape recorder.

The above-mentioned recording jack may be in the form of a microphone jack which connects a microphone to a tape recorder or an auxiliary jack which connects a radio receiver to a tape recorder.

The above and other objects and attendant advantages of the present invention will be more readily apparent to those skilled in the art from a reading of the following detailed description referring to the accompanying drawings in which various different embodiments of devices of the invention are illustrated.

PREFERRED EMBODIMENTS OF THE INVENTION

Figure 1:
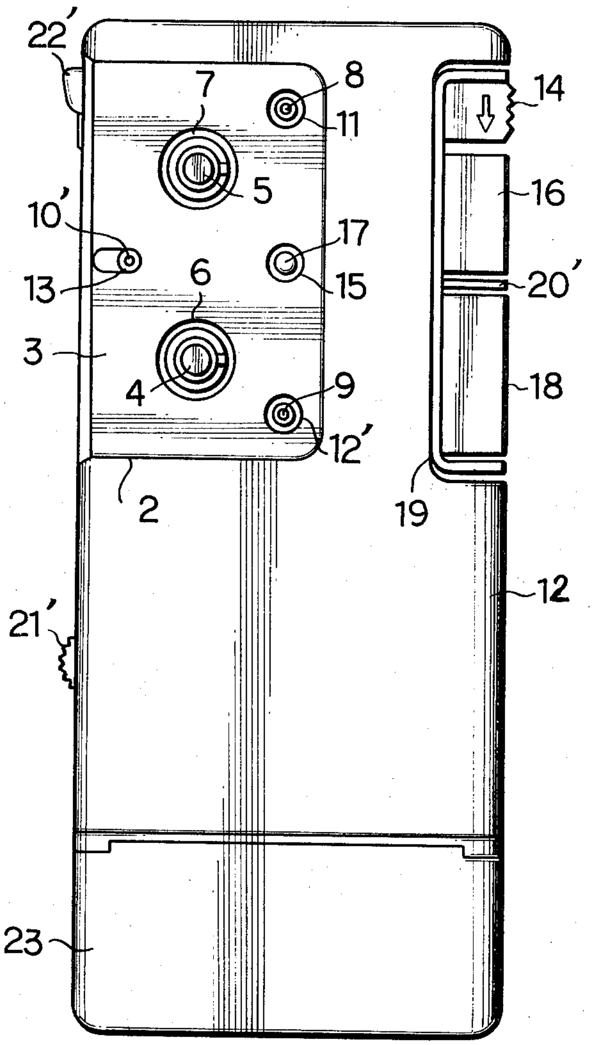
FIG. 1 is a view of a tape recorder incorporating therein one of the devices of the invention which is adapted to prevent information recorded on a magnetic tape from being inadvertently erased.

The present invention will be now described referring to the accompanying drawings and more particularly, to FIG. 1 thereof in which a tape recorder which incorporates therein one of the devices of the invention.

The tape recorder generally comprising a casing 1 having an opening 2 in which a spring-loaded cassette loading deck 3 is movably received. The deck 3 is movable between a first position in which the exposed surface of the cassette loading deck is flush with the surface of one side wall of the casing 12 (the front side wall surface as seen in FIG. 1) and a second position in which the exposed surface of a tape cassette (not shown) when loaded on the deck 3 is flush with the above-mentioned side wall surface of the casing 12. When loaded on the deck 3, the cassette on which a tape is carried is releasably held in its operative position by means of guide pins 8, 9 and 10′ provided on the casing 12 at spaced points on the side wall of the casing opposite to and extending towards the first-mentioned side wall. The cassette loading deck 3 has openings 11, 12′ and 13 through which the guide pins 8, 9 and 10′ extend, respectively and the cassette also has openings (not shown) in alignment with the openings 11, 12′ and 13 in the deck 3, respectively and the pins 8, 9 and 10′ also extend through the openings in the cassette when the cassette is loaded on the deck 3. The deck 3 is normally urged to the first position by means of a spring (not shown). The pin 10′ is movable and normally biassed towards the pins 8 and 9 by means of a spring (not shown) so that the cassette is held in its operative position on the deck 3 by the cooperating pins 8, 9 and 10′when the deck is in the second position referred to above. A cassette release knob 22 is provided in the casing 1 and operatively connected to the pin 10′ in such a manner than when manipulated, the knob 22′ moves the pin 10′ away from the pins 8 and 9 against the force of the spring which urges the pin 10′ towards the pins 8 and 9. As the pin 10′ moves away from the pins 8 and 9 in the manner mentioned just above, the cassette is released from the holding force by the pin 10′ whereupon the cassette loading deck 3 is urged back to the first position carrying the cassette thereon by the spring and the cassette is then ready to be removed from the deck 3 and accordingly, from the tape recorder.

As seen in any of the conventional tape recorder, a capstan 17 extends from the rear side wall of the casing 12 (as seen in FIG. 1) through an opening 15 in the deck 3 and an aligned opening (not shown) in the cassette when the latter is loaded on the deck. The capstan 17 is adapted to cooperate with a pinch roller (not shown) provided in the tape recorder casing 12 at a suitable position in the conventional manner in driving a tape (not shown) in the cassette when the cassette having the tape therein is held in the operative position on the deck 3. Reel drive spindles 4 and 5 extend from the rear side wall of the casing 1 through corresponding openings 6 and 7 in the deck 3 and aligned openings (not shown) in the cassette when the latter is in its operative position. Thus, when the tape recorder is operated, the capstan 17 and pinch roll engage and drive the portion of the tape extending between the reels (not shown) in the cassette in one or the other direction depending upon the purpose for which the tape recorder is operated.

An erasing knob 14 for actuating an erasing head (not shown), a recording and reproducing knob 16 for actuating a recording and reproducing head (not shown) and a stop knob 18 for rendering the recording knob 14 and/or the recording and reproducing knob 16 inoperative are operatively received in an opening 19 provided in the casing 1 opposite to an opening 2 in which the cassette loading deck 3 is received. A volume control knob 21′ is also provided in one end wall of the casing 1 (the left end wall as seen in FIG. 1) at a point below the opening 2 and an electric power supply source 23 is detachably connected to the casing 1 in the manner as shown in FIG. 1.

Figure 2:
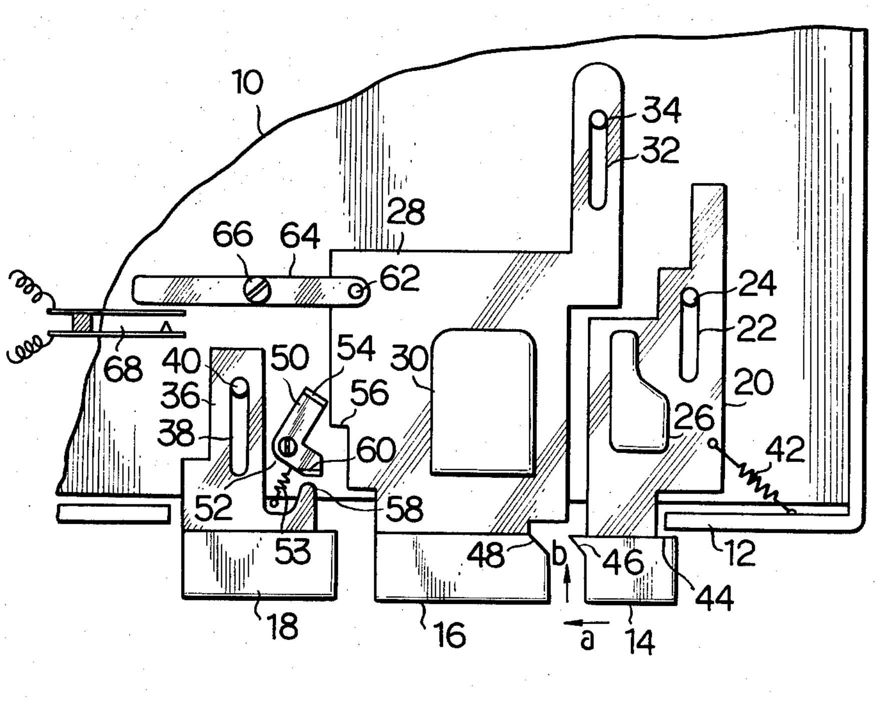
FIG. 2 is a fragmentary schematic view of said tape recorder on an enlarged scale showing the constructions and arrangements of the erasing head recording and reproducing head and stop mechanisms of the tape recorder.

FIG. 2 of the accompanying drawings shows in detail the constructions and arrangements of the erasing head, recording and reproducing head and stop mechanisms of the tape recorder of FIG. 1.

A chassis C is provided within the casing 12 extending transversely of the interior of the casing to divide the depth of the interior into two compartments.

The erasing knob 14 is mounted on a sliding lever 20 having the shape as shown which is provided with an elongated slot 22 therein and carries a magnetic erasing head 26. The slidable erasing lever 20 is adapted to slidably move along a guide pin 24 provided in chassis C. The slidable lever 20 is normally urged outwardly by a compression spring 42 one end of which is anchored to the lever while the other end of which is anchored to the casing 1. The recording and reproducing knob 16 is secured to a slidable recording and reproducing lever 28 on which a recording and reproducing head 30 is mounted and the lever is provided with an elongated slot 32 through which a guide pin 34 secured to the chassis 10 extends. Thus, the slidable lever 28 is adapted to slidably move along the pin 34. Although not shown, the slidable lever 28 is also normally urged outwardly by a compression spring anchored at the opposite ends to the lever and chassis. The stop knob 18 is mounted on slidable lever 36 which is provided with an elongated slot 38 through with a guide pin 40 secured to the chassis 10 extends and thus, the lever is slidably moved along the pin 40. The slidable lever 36 is also normally urged outwardly by a compression spring (not shown) which is anchored at the opposite ends to the lever and casing. The spring 42 extending between the slidable lever 20 and casing 12 also urges to pivot the erasing knob 14 about the pin 24 in the counterclock wise direction (as seen in FIG. 2) to cause a shoulder 44 on the knob 14 to abut against the casing 12. In this position, the recording knob 14 cannot be depressed in the arrow direction *b* in FIG. 2.

A L-shaped lever 50 is provided between the slidable lever 28 on which the recording and reproducing head 30 is mounted and the slidable lever 36 on which the stop knob 18 and the lever 50 is pivoted to the chassis 10 by pivot pin 52. A spring 53 extends between one arm of the L-shaped lever 50 and the chassis C and thus, the lever 50 is adapted to be biassed about the pin 52 in the clockwise direction (as seen in FIG. 2). The other arm of the L-shaped lever 50 is provided with a rim 54 bent at right angles to the remaining portion of the associated lever arm which rim is normally urged against the adjacent side edge of the sliding lever 28. When the recording and reproducing knob 16 is depressed in the arrow direction *b* in FIG. 2 so as to slide the lever 28 on which the knob 16 is mounted in the same direction until the rim 54 of the L-shaped lever 50 engages a step 56 in the side edge of the lever 28 whereupon the lever 28 is locked in this position. Then, when the stop knob 18 is depressed in the arrow direction *b* until a projection 58 formed with the slidable lever 36 on which the stop knob 18 is mounted engages and pushes a rim 60 which is formed with the first-mentioned arm of the lever 50 at right angles to the remaining portion of the associated lever arm whereupon the L-shaped lever 50 is pivoted about the pin 52 in the counterclock wise direction and as a result, the rim 54 disengages from the stop 56 and the lever 28 and the recording and reproducing knob 18 mounted thereon are returned to their initial position. The slidable lever 28 has one end of a rocking bar 64 pivoted thereto by means of a picot pin 62 and the other end of the rocking bar 64 is adapted to engage and actuate a switch 68 leading to an amplifier circuit and a control circuit (not shown). The rocking bar 64 is also pivoted at a midpoint 66 between the opposite ends to the chassis C.

In the operation of the above-mentioned tape recorder, the erasing knob 14 is first displaced in the arrow direction *a* so as to disengage its shoulder 44 from the casing 1 until a projection of nose 46 on the knob 14 engages a notch 48 in the recording and reproducing knob 16. Thereafter, the knobs 14 and 16 which are in engagement with each other by means of the projection 46 and notch 48 thereof are depressed in the arrow direction *b* until the magnetic erasing head 26 and magnetic recording and reproducing head 30 abut against the magnetic tape (not shown) which is received in the cassette. On the other hand, when the tape recorder is operated for reproduction, only the recording and reproducing knob 16 is depressed until the magnetic recording and reproducing head 30 abuts against the tape.

Figure 3:
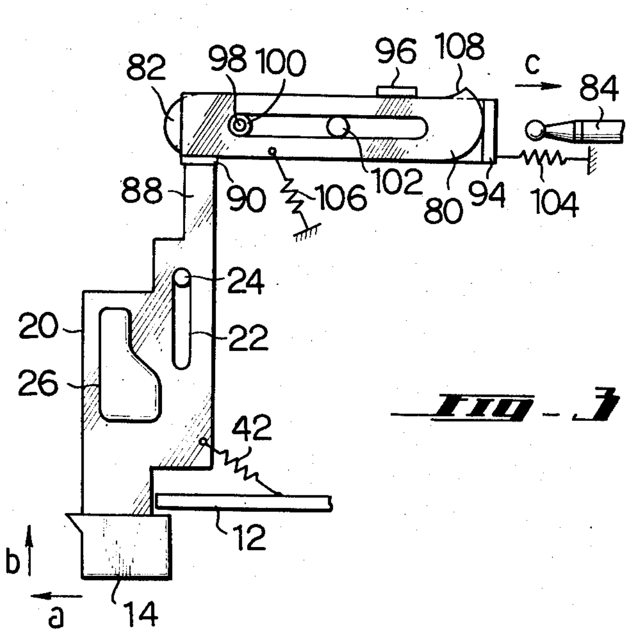
FIGS. 3 to 12 inclusive are schematic views of various different forms of devices adapted to prevent information recorded on a magnetic film from being inadvertently erased embodying the present invention, respectively.
Figures 4, 5, 6:
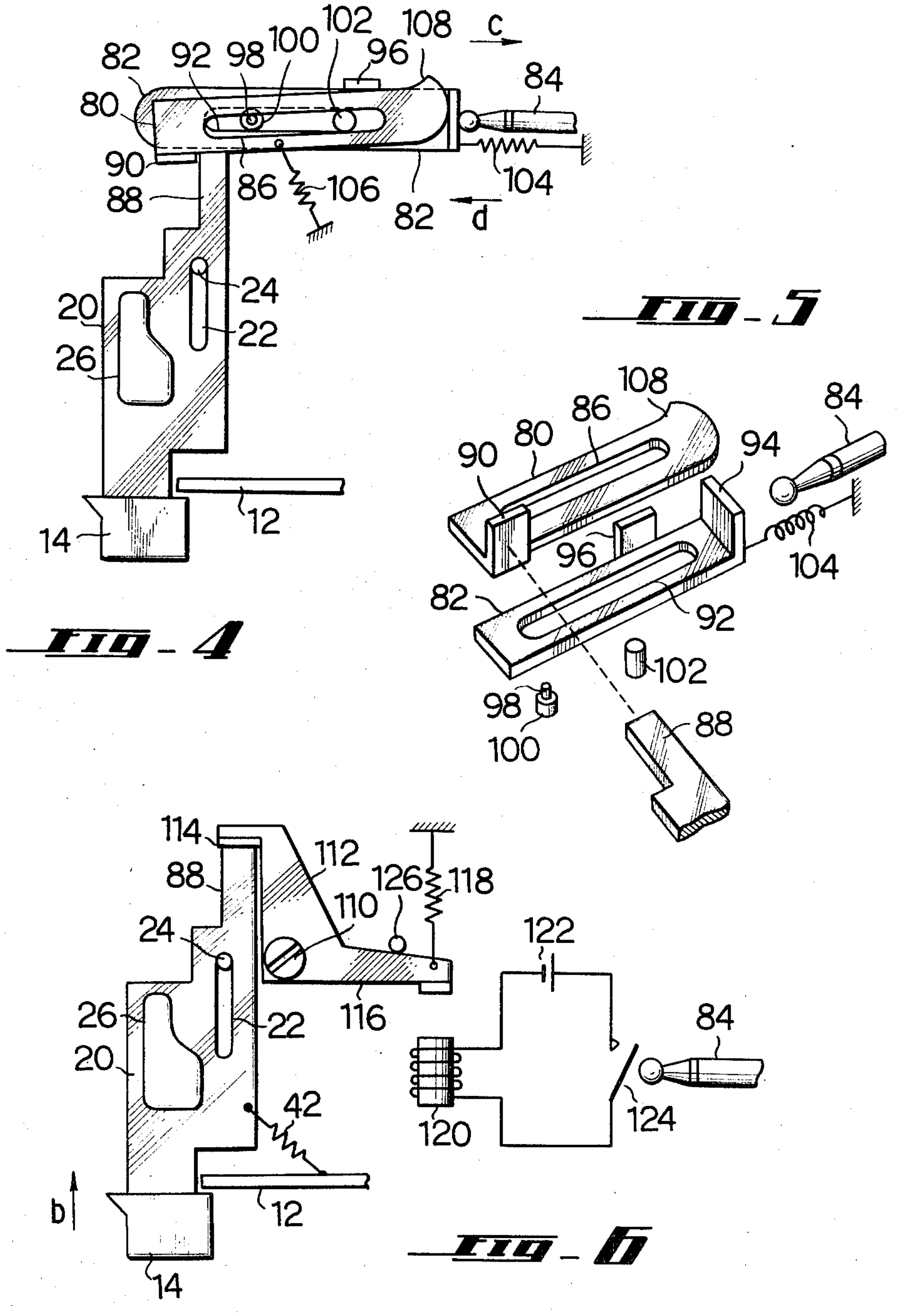

FIGS. 3 to 5 inclusive illustrate a first or preferred form of device according to the present invention which is adapted to prevent informations recorded on a magnetic tape from being inadvertently erased. The illustrated device generally comprises two superposed plates 80 and 82. In FIG. 3, a microphone jack 84 as a recording jack is shown in a position in which the jack is not fully inserted in a jack insertion opening formed in the tape recorder (not shown). The upper or front plate 80 (as seen in FIGS. 3 to 5) is provided with an elongated slot 86 (FIG. 5) and a rim 90 on one side which is bent at right angles to the remaining portion of the plate 80. The innermost portion 88 of the abovementioned slidable lever 20 on which the erasing head 26 is mounted is adapted to abut against the rim 90. The lower or rear plate 82 (as seen in FIGS. 3 to 5 inclusive) is also provided with an aligned elongated slot 92 the position and size of which correspond to those of the slot 86 in the plate 80 and the plate 82 has at one end a rim 94 disposed at right angles to the remaining portion of the plate 82 and a rim 96 on one side disposed at right angles to the remaining portion of the plate 82. The leading end of the microphone jack 84 is adapted to abut against the rim 94 when the jack is inserted in the jack opening and the rim 96 is adapted to engage the adjacent side edge of the plate 80. The plates 80 and 82 referred to just above are clearly shown in an exploded state in the perspective view of FIG. 5. The aligned slots 86 and 92 in the plates 80 and 82 receive therein a guide pin 100 having a reduced diameter projecting stopper 98 and a conventional pin 102 which pins extend from the chassis 10. The length of the stopper 98 corresponds to the thickness of the plate 80 and the length of the larger diameter pin 100 corresponds to the thickness of the plate 82, respectively. The plate 82 is normally biassed in the arrow direction *c* by means of spring 104 extending between the plate 82 and chassis 10. The plate 80 is normally biassed by component forces both in the arrow direction *c* and counterclock wise direction and the bias of the plate 80 in the arrow direction *c* is limited by the rim 94 of the plate 82. In the position of the plates 80 and 82 as shown in FIG. 3, the erasing knob 14 can be disengaged from the casing 12 by displacing the knob in the arrow direction *a* (FIG. 3), but the knob 14 cannot be pushed in the arrow direction *b* together with the recording and reproducing knob 16 because the innermost portion 88 of the lever 20 is in abutment against the rim 90 of the plate 80. In this position of the erasing knob 14, the erasing head 26 cannot be abutted against the magnetic tape and accordingly, information recorded on a magnetic tape may not be erased.

FIG. 4 shows the microphone jack 84 in its fully inserted position in the jack insertion opening in the tape recorder (not shown). When the microphone jack 84 is inserted in this way, the plates 80 and 82 are displaced in the arrow direction *d* against the force of the spring 104 and at the same time, the innermost portion 88 of the slidable lever 20 disengages from the rim 90 so that the plate 80 will be allowed to pivot about the pin 102 by a small distance in the counterclock wise direction. As the plate 80 pivots in the manner mentioned above, the rim 96 of the plate 82 contacts a nose 108 provided in the plate 80 and as a result, even the plate 82 is biassed in the arrow direction *c* by the spring 104 the microphone jack can be effectively prevented from being slipping out of the jack insertion opening. In other words, even when the force of a self-holding spring force applied on the jack 84 decreases due to any prolonged use of the jack, the jack will not be pushed back thereby to eliminate any insufficient contact with the plate assembly 80, 82. After the microphone jack 84 has been fully inserted in the jack insertion opening in this manner, the locking mechanism which prevents information recorded on a magnetic tape from being inadvertently erased is released, the slidable lever 20 and accordingly, the erasing head 14 mounted thereon can be depressed inwardly and the recording and reproducing head 30 and erasing head 26 (FIG. 2) are allowed to abut against the magnetic tape in the cassette whereby a desired recording can be made.

When the microphone jack 84 is pulled out of the jack insertion opening (not shown), the plate 82 is first allowed to return to its initial position by the force of the spring 104 whereupon the rim 96 of the plate 82 engages and pushes the nose 108 on the plate 80 and thus, the plate 80 is caused to pivot about the pin 102 in the clockwise direction to the initial position as shown in FIG. 3 in which the slots 86 and 92 in the plates 80 and 82 are aligned with each other. As far as the microphone jack is not inserted in the jack insertion opening, the levers 20 and 28 are maintained in their locked position and there will be no possibility that information recorded on the tape will be inadvertently erased or the tape is inadvertently recorded informations thereon.

FIG. 6 illustrates a modified embodiment of device according to the invention which prevents information recorded on a magnetic tape from being inadvertently erased. The modified device utilizes an electromagnet in the locking mechanism. The innermost portion 88 of the slidable lever 20 is engaged and locked by one arm 114 of a control lever 112 which is pivoted at 110 to the chassis 10. A spring 118 extends between the other arm 116 of the control lever 112 and chassis 10 so that the control lever may be pivoted about the pin 110 in the counterclock wise direction. Reference numeral 120 denotes an electromagnet to be energized from a voltage source 122. When the switch 124 is thrown in by the insertion of the microphone jack 84 into the jack insertion opening, simultaneously, the device is set into operation. The voltage source 120 may be concurrently used as the power source for driving the tape recorder. When the jack 84 is not inserted in the jack insertion opening, the electromagnet 120 is not energized and accordingly, the lever 20 cannot be depressed in the arrow direction *b* because the lever 20 is engaged and locked by the arm 114 of the control lever 112. As mentioned above, when the microphone jack 84 is inserted into the jack insertion opening and the switch 124 is thrown in, the electromagnet 120 is energized. The energized magnet 120 attracts the arm 116 of the lever 112 outwardly against the force of the spring 118 whereupon the arm 114 of the control lever 112 is disengaged from the innermost portion 88 of the lever 20 so as to release the lever 20 from its locked position whereby the erasing head 26 can be depressed towards the magnetic tape in the cassette if the tape cassette is loaded on the deck 3 and consequently, the abovementioned recording operation can be effected. In this modified embodiment of device, a pin 126 is secured to the chassis 10 and the pin is adapted to limit the movement of the control lever in the counterclock wise direction. The purpose of the limitation of the movement of the control lever 112 in the counterclock wise direction is that if such movement is not limited, when the microphone jack 84 is pulled out of the jack insertion opening with the erasing knob 14 maintained in its depressed position the control lever 112 pivots about the pin 126 to an undesirably excess amount and consequently, when the erasing knob 14 is then returned to its initial position the arm 114 of the control lever 112 may not properly align with the innermost portion 88 of the lever 20.

Figures 7, 8, 9:
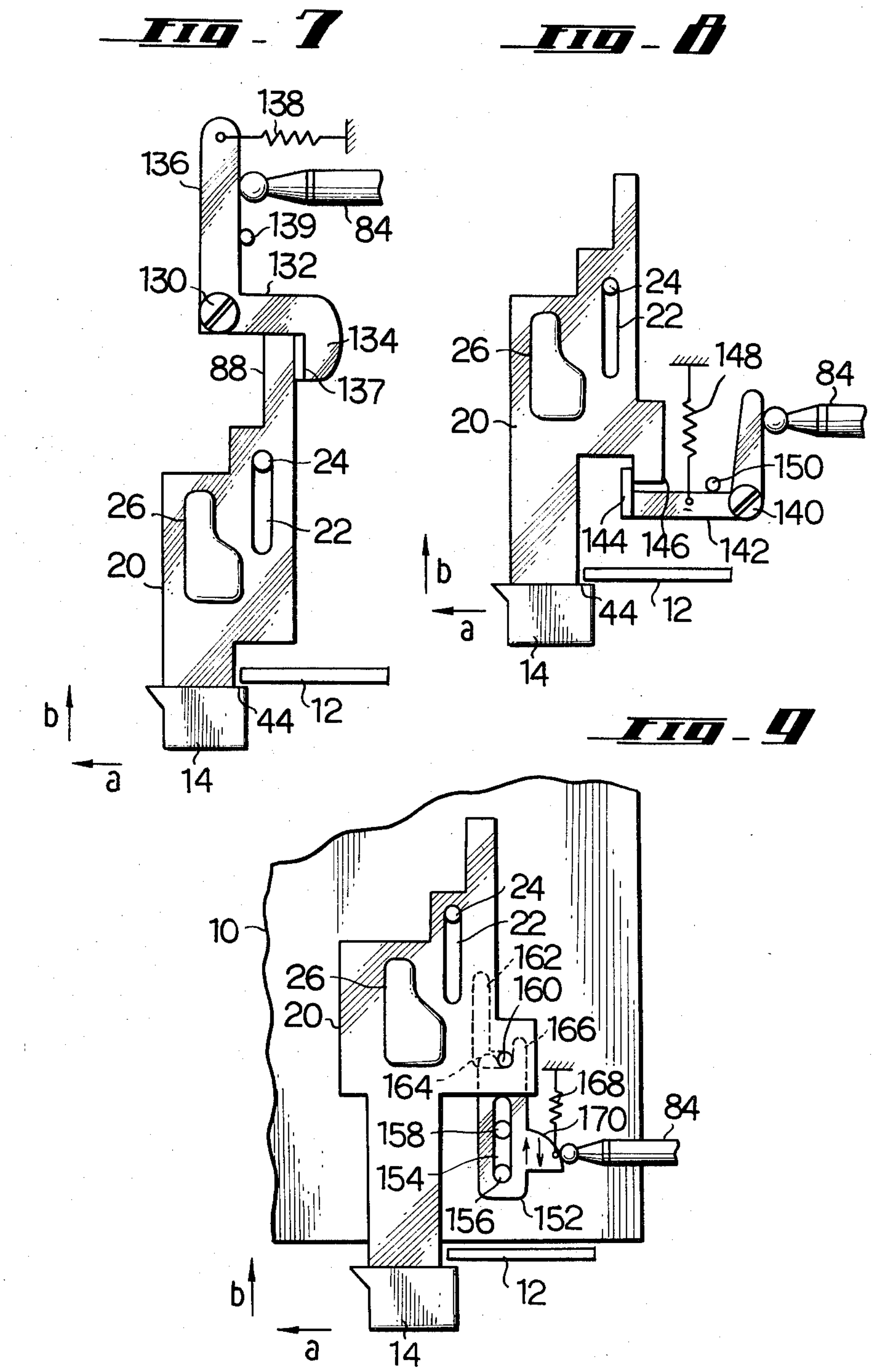

FIG. 7 illustrates a further modified embodiment of device according to the invention. In this modified device, the innermost portion 88 of the erasing lever 20 is engaged and locked by a rim 137 at the end of one arm 134 of a control lever 132 pivoted at 130 to the chassis 10 and the other arm 138 of the lever 132 is biassed about a pin 130 secured to the chassis 10 in the clockwise direction by a spring 138 extending between the lever arm and chassis. In this position of the lever 20, the lever cannot be displaced in the arrow direction *a* because its innermost portion 88 is engaged and locked by the rim 137 and accordingly, the shoulder 44 of the erasing knob 14 which is depressed when a recording is made will not disengage from the casing 1 and the knob 14 cannot be depressed in the arrow direction *b*. When the microphone jack 84 is further pushed leftwards to its full insertion position in the jack insertion opening, the innermost portion 88 of the lever 20 is disengaged from the rim 137 on the arm 134 of the control lever 132. As a result, the erasing knob 14 may be displaced in the arrow direction *a* so as to disengage the shoulder 44 from the casing 1 whereby the knob can be depressed in the arrow direction *b* and a desired recording can be made. Also in this modified embodiment of device, the movement of the control lever 132 in the clockwise direction is limited by a pin 139 secured to the chassis and the function of the pin 139 is identical with the pin 126 explained in connection with the device of FIG. 6.

FIG. 8 illustrates a still further modified embodiment of device of the invention. The lever 20 employed in this modified device is somewhat different from the corresponding lever in the preceding embodiments of devices of FIGS. 3 to 7 inclusive. As clear from this Figure, the locking mechanism comprises a control lever 142 pivoted to the chassis 10 by a pivot pin 140 which is in turn secured to the chassis 10. One arm of the lever 142 has a rim 144 provided at the free end at right angles to the remaining portion of the arm and the lever 20 is provided at the outer edge with a rim 146 at right angles to the remaining portion of the lever 20 for engagement with the rim 144. A spring 148 extends between the arm of the control lever 142 and chassis 10 for normally biassing the control lever 142 about the pin 142 in the clockwise direction. Accordingly, in this position of the parts of FIG. 8, the erasing knob 14 mounted on the lever 20 cannot be displaced in the arrow direction *a* and a recording cannot be effected. However, as the microphone jack 84 is fully inserted into the jack insertion opening (not shown), the control lever 142 is pivoted about the pin 140 in the counterclock wise direction against the force of the spring 148 and the rim 144 disengages from the rim 146 on the lever 20 and as a result, the shoulder 44 on the erasing knob 14 disengages from the casing 12 so that the knob 14 can be depressed in the arrow direction *b* whereupon the tape recorder is ready for recording operation.

In the device of FIG. 8, the movement of the control lever 142 in the clockwise direction is limited by a pin 150 secured to the chassis. The reason for which such movement of the control lever is limited is that if the control lever is not limited in the clockwise movement, as the microphone jack 84 is pulled out of the jack insertion opening with the erasing knob 14 maintained in its depressed position, the control lever would pivot about the pin 140 to an undesirably excess amount by the pulling force of the spring 148 and when the erasing knob 14 is thereafter returned to its initial position the rim 144 of the control lever would not properly align with the rim 146 of the lever 20.

FIG. 9 illustrates a still further modified embodiment of device of the invention and and in this embodiment the locking mechanism includes a control plate 152 disposed between the lever 20 and chassis 10.

The control plate 152 has an elongated slot 154 in the center and one or inner end of the plate is bifurcated so as to provide arms of different lengths 164 and 166. The longer arm 166 is provided on one side or the outer side with a sector-shaped projection 170. The inner end portions of the arms 164 and 166 receive therebetween a guide pin 160 extending from the lever 20 and the inner end portions of the arms are smoothly curved on their inner or opposite sides so that the control plate 152 may be smoothly guided along the pin 160. The sector projection 170 is arcuated on the side directing to the bifurcated end of the plate 152.

The pin 160 on the lever 20 is adapted to be guided along a L-shaped slot 162 formed in the chassis 10 as the lever is moved relative to the chassis. The movement of the pin is stopped when the pin is received within the space defined by the free end portions of the control plate 152. Reference numeral 168 denotes a spring a having predetermined biassing rating and the spring normally biasses the control plate 152 in the dotted arrow direction.

With the construction and arrangement of the device of FIG. 9, when the sector portion 170 is pushed inwardly by the leading end of the microphone jack 84 as the actuating member as the jack is inserted into the jack insertion opening in the casing 12, the jack is caused to slidably move along the arcuated side of the sector projection 170. As a result, the sector projection 170 and accordingly, the control plate 152 is displaced in the full line arrow direction against the force of the spring 168. After the jack 84 has been fully inserted into the jack insertion opening and the control plate 152 has been displaced to a predetermined position, the inner end portion of the shorter arm 164 is moved out of its alignment with the L-shaped slot 162 in the chassis 10 and the arm will release the guide pin 160 secured to the lever 20 from its locked position.

Thus, the lever 20 pushes the erasing knob 14 in the arrow direction *a* and accordingly, the pin 160 on the lever 20 is guided along the L-shaped slot 162 in such a manner that the lever 20 and the adjacent lever 28 may be set in a position ready for recording.

With the above-mentioned operation for recording, the tape recorder can positively and smoothly function eliminating the possibility of inadvertent erasing and/or improper recording.

Figures 10, 11:
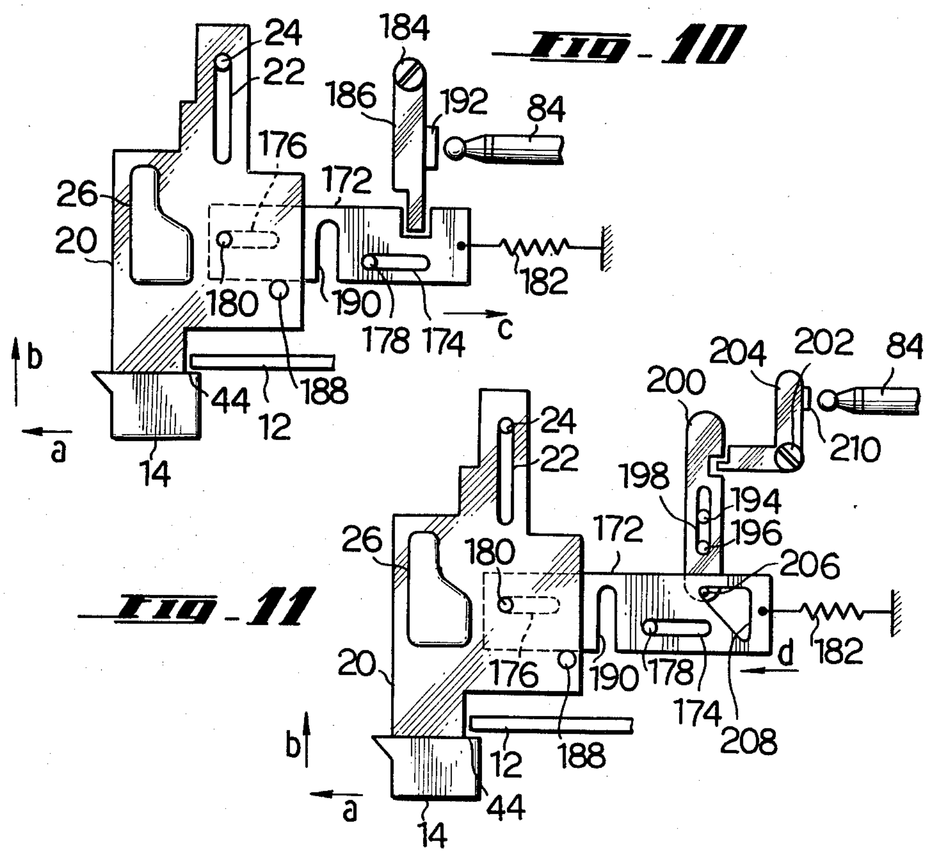

FIG. 10 illustrates a still further modified embodiment of device according to the invention and in this embodiment, the locking mechanism comprises a control plate 172 and a rocking lever 186, for example. The control plate 172 is slidable in the space between the lever 20 and chassis 10. The control plate 172 has two spaced elongated slots 174 and 176 and the slot 174 receives a pin 178 secured to chassis 10 while the slot 176 receives a pin 180 secured to the chassis 10. A compression spring 182 extends between the control plate 172 and chassis 10 for normally biassing the plate 172 in the arrow direction *c*. In the position of the microphone jack 84 shown in FIG. 10 in which the microphone jack 84 is separated from an electrically insulated abutment portion 192 of the rocking lever 186 which is pivoted to the chassis 10 by a pivot pin 184, the erasing knob 14 can be displaced in the arrow direction *a*, but the knob cannot be depressed in the arrow direction *b* because the outer side edge of the control plate 172 is engaged by a pin 188 extending from the lever 20. Therefore, in this position of the control plate 172 the erasing knob 14 cannot be operated. However, when the jack 84 is pushed inwardly to abut against the portion 192 so as to rock the lever 186, the rocking lever 186 slidably moves in the arrow direction *d* against the force of the spring 182. As the rocking lever 186 is displaced in the manner mentioned above, the erasing knob 14 is displaced in the arrow direction *a* until the shoulder 44 on the erasing knob 14 disengages from the casing 12 whereupon the pin 188 is received in a slot 190 formed in the control plate 172 so that the erasing knob 14 may be depressed in the arrow direction *b* ready for recording operation.

FIG. 11 illustrates a modification of the device as shown in FIG. 10. As clear from this Figure, the device of FIG. 11 is different from that of FIG. 10 only in the fact that a different drive mechanism for the control plate 172 is employed The drive mechanism of FIG. 11 comprises a rocking lever 200 having an elongated slot 198 through which a pair of guide pins 194 and 196 secured to the chassis C extend and a L-shaped lever 204 pivoted to the chassis 10 by a pivot pin 202. In the position of the microphone jack 84 shown in FIG. 11 in which the jack 84 is separated from the L-shaped lever 204, the lever 20 cannot be displaced in the arrow direction *a* because the outer side edge of the control plate 172 is engaged by the pin 188 extending from the lever. However, when the microphone jack 84 is further inserted deep into the jack opening until the jack abuts against an electrically insulated portion 210 on one arm of the L-shaped lever 204, the lever 204 is pivoted so as to move the other arm of the lever 204 outwardly. As the other arm of the lever moves outwardly in the manner mentioned above, the arm pushes the plate 200 outwardly until a pin 206 on the outer end portion of the plate 200 abuts against the ramp of a triangular opening 208 formed in the control plate 172 whereupon the control plate 172 is slidably displaced in the arrow direction *d* against the force of the spring 182. As the control plate 172 is displaced in the manner mentioned just above, the erasing knob 14 is displaced in the arrow direction *a* as mentioned in connection with FIG. 10 until the shoulder 44 on the knob disengages from the casing 12 and the pin 188 is received in the slot 190. Thereafter, when the erasing knob 14 is depressed in the arrow direction *b*, a desired recording can be effected.

Figure 12:
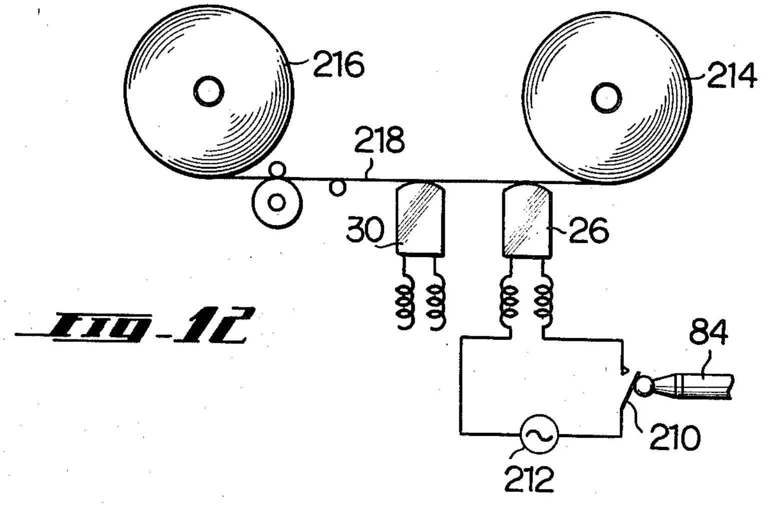

FIG. 12 illustrates a still further modified embodiment of device according to the invention and in this embodiment the erasing head employed is in the form of an electromagnetic head 26 and a switch 210 is provided in the electric circuit to the head 26. In the device of this Figure, when the arrangement is so made that only when the microphone jack 84 is fully inserted into the jack insertion opening the switch 210 is closed so as to connect the erasing head 26 to an erasing signal generator 212, as far as the jack 84 is not inserted into the jack insertion opening, informations recorded on the magnetic tape 218 wound on the tape reels 214 and 216 will not be inadvertently erased and accordingly, even if the erasing knob 14 connected to the erasing head 26 is inadvertently depressed and the head abuts against the tape 218, informations recorded on the tape will not be erased.

It is clear that in any of the foregoing embodiments of the devices according to the invention the rim on the control plate against which the leading end of the microphone jack abuts and the ends of the various levers must be electrically insulated. The present invention is in no way limited to the precise embodiments described hereinabove, but rather various modifications and changes may be resorted to on them. For example, when any of the devices mentioned hereinabove is employed in conjunction with a tape recorder which records from a radio, television or gramaphone record and has a separate insertion plug opening other than a microphone jack insertion opening, a recording jack may be integrally formed with the microphone jack and in such a case, the recording jack is locked in position with a spring force greater than that of the spring provided in the locking mechanism. Any of the above-mentioned devices of the invention can be equally employed when a recording and reproducing connector is employed for connection between an amplifier and a tape recorder.

As mentioned above, any of the devices described hereinabove is so designed that only after the microphone jack has been fully and properly inserted into the jack insertion opening the erasing head is actuated and therefore, information recorded in the magnetic tape would not be inadvertently erased even if the erasing head is erroneously actuated and improper recording due to insufficient insertion of the microphone jack into the jack insertion opening can be effectively prevented.

While several embodiments of the invention have been shown and described in detail it will be understood that the same are for illustration purpose only and are not to be taken as a definition of the invention and that various modifications and changes on the same will be easily occurred to those skilled in the art without departing and within the scope of the invention as defined in the appended claims.

We claim:

1. In a tape recorder having a chassis, apparatus for preventing the accidental erasure of information previously recorded on tape in said recorder, which comprises:

a first, spring-biassed lever, slidably movable, on said chassis inwardly towards said tape, spring bias normally urging said lever outwardly away from said tape;

a record/reproduce head mounted to said first lever and engaging said tape when said first lever is moved inwardly towards said tape;

a second, spring-biassed lever, slidably movable, on said chassis, inwardly towards said tape about a pivot point permitting limited rotational movement, spring bias normally urging said second lever outwardly away from said tape;

an erase head mounted to said second lever and engaging said tape when said second lever is moved inwardly towards said tape;

a first projection on said recorder engaging a recess on said second lever to inhibit movement thereof towards said tape when said movement is directed along a path substantially normal to said tape, said projection having a dimension such that when said movement is combined with limited rotation of said lever, about said pivot point, the projection fails to intercept said recess, thereby permitting said erase head to contact said tape;

a second projection on said second lever, for mating engagement with a corresponding recess in said first lever, said second lever, when moved, and simultaneously rotated about said pivot point, to bring said erase head into engagement with said tape, moving said first lever, and hence said record/reproduce head into contact with said head;

a spring-biassed third lever, engaging a detent on said first lever, for locking said first lever when moved inwardly towards said tape;

means for rotating said third lever out of engagement with said detent to release said first lever so that it may move said record/reproduce head out of engagement with said tape under spring-bias action; and inhibiting means, responsive to the insertion of a microphone jack into an aperture of said recorder, for inhibiting rotation of said second lever, and hence the recording of said erase head inwardly towards said tape, full and complete insertion of said jack moving said inhibiting means to permit rotation of said second lever and hence the recording of new information on said tape.

2. The apparatus according to claim 1, wherein said second lever has rearwardly extending extension and said inhibiting means comprises:

a first elongated plate having an elongated central slot therein, a first upwardly extending portion at one end thereof, and a second upwardly extending portion along one side thereof, proximate said first upwardly extending portion;

a second elongated plate having a second, elongated, central slot therein, co-extensive with the elongated slot in said first plate, a curved nose at one end of said second plate for engagement with the first extending portion of said first plate, and a third upwardly extending portion at the other end thereof for engagement with the rearwardly extending extension on said second lever, to inhibit rotation of said second lever;

a first pin extending from said chassis through the elongated slots in said first and second plates;

a second pin, having a portion of reduced diameter, extending through said elongated slots in said first and second plates, said first and second pins restraining said first plate for only lateral displacement, the reduced diameter of the second pin permitting limited rotation of said second plate, in addition to lateral displacement;

first spring means for biassing said first plate towards said aperture in said recorder; and second spring means for biassing said second plate so that said third upwardly extending portion engages said rearwardly extending extension on said second lever, full and complete insertion of said microphone jack causing the first upwardly extending portion of the first plate to bear against the curved surface of said nose, thereby displacing, and rotating, said second plate, between said second pin and the second upwardly extending portion of the first plate, to move the third upwardly extending portion of the second plate out of engagement with the rearwardly extending extension of said second lever, permitting rotation of same, and engagement of the erase head with the tape.

3. The apparatus according to claim 1. wherein said second lever has a rearwardly extending extension and said inhibiting means comprises:

a third lever, pivotally mounted to said chassis, and having an extension at one end thereof for engaging the rearward extension of said second lever to inhibit rotation of the latter;

spring means for biassing said third lever into engagement with said second lever;

electromagnet means for attracting the other end of said third lever and rotating the same about the pivot thereof, against said spring bias, and disengage said third and said second levers;

electrical switch means, actuated by the full and complete insertion of said microphone jack, for energizing said electromagnet means, thereby permitting rotation of said second lever and engagement of said erase head with said tape.

4. The apparatus according to claim 1, wherein said second lever has a rearwardly extending extension and said inhibiting means comprises:

a fourth, L-shaped lever, pivotally mounted to said chassis rearwardly of said second lever, said fourth lever having a forward extension at one end thereof engaging a side surface of said rearwardly extending extension to inhibit rotation of said second lever;

third spring means for biassing said fourth lever into engagement with said second lever; and a pin for limiting rotation of said fourth lever in the direction of the bias of said third spring means, insertion of said microphone jack rotating said fourth lever, about the pivot thereof, out of engagement with said second lever and permitting rotation thereof and engagement of said erase head with said tape.

5. The apparatus according to claim 1, wherein said second lever has a forwardly extending extension and said inhibiting means comprises:

a fifth L-shaped lever, pivotally mounted to said chassis forwardly of said second lever, said fifth lever having a rearward extension at one end thereof engaging a side surface of said forwardly extending extension, to inhibit rotation of said second lever;

fourth spring means for biassing said fifth lever into engagement with said second lever; and pin means for limiting rotation of said fifth lever in the direction of the bias of said fourth spring means, insertion of said microphone jack rotating said fifth lever, about the pivot thereof, out of engagement with said second lever and permitting rotation thereof and engagement of said erase head with said tape.

6. The apparatus according to claim 1, wherein said second lever has a downwardly extending pin, and said inhibiting means comprises:

a rearwardly extending member having an elongated central slot therein, an arcuate surface on one end thereof constituting a cam, and a bifurcated portion including two tines, receiving said downwardly extending pin, at the other end thereof, said tines being of unequal length;

a pair of upwardly extending pins on said chassis, engaging said elongated slot in said rearwardly extending member, and limiting same to motion normal to the plane of said tape; and fifth spring means for biassing said member rearwardly to capture said downwardly extending pin in said bifurcation and inhibit rotation of said second lever, complete insertion of said microphone jack engaging said cam and forcing said member forward, permitting said downwardly extending pin to travel over the surface of the shorter one of said tines, and escape from said bifurcation thus permitting said second lever to rotate and bring said erase head into engagement with said tape.

7. The apparatus according to claim 1, wherein said second lever has a downwardly extending pin mounted proximate the front end thereof, and said inhibiting means comprises:

a rectangular plate having a pair of elongated longitudinal slots therein, a first transverse slot for engagement with said downwardly extending pin, and second transverse slot on the opposite side of said plate from said first transverse slot;

a pair of pins extending from said chassis and engaging said longitudinal slots to limit the travel of said plate to a direction which is normal to the direction of travel of said second lever;

sixth spring means for biassing said plate towards the aperture through which said microphone jack is inserted, the edge of said plate contacting said downwardly extending pin and inhibiting rotation of said second lever; and an actuating member having one end pivoted to said chassis, the other end thereof being inserted in said second transverse slot, complete insertion of said microphone jack rotating said actuating member about the pivot thereof and, in turn, moving said plate against the bias of said sixth spring means, whereby said downwardly extending pin enters said first transverse slot thereby permitting rotation of said second lever and engagement of said erase head with said tape.

8. The apparatus according to claim 7, wherein said plate has a triangular aperture therein, said actuating member has an elongated central slot therein, a recess at the upper end thereof, and an upwardly extending pin at the other end thereof engaging said triangular aperture, and the apparatus further comprises:

a sixth L-shaped lever pivoted to said chassis, one end thereof engaging the recess in said actuating member, complete insertion of said microphone jack engaging the other end of said sixth L-shaped lever, rotating same to displace said plate against said spring bias, thereby permitting said second lever to rotate.

* * * * *